US011449351B2

(12) United States Patent
Edge et al.

(10) Patent No.: US 11,449,351 B2
(45) Date of Patent: Sep. 20, 2022

(54) HISTORY AWARE INTERFACES

(71) Applicant: Microsoft Technology Licensing, LLC, Redmond, WA (US)

(72) Inventors: Darren Edge, Cambridge (GB); Jonathan Larson, Bremerton, WA (US); Chris Trevino, Bremerton, WA (US); Chris White, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 207 days.

(21) Appl. No.: 15/966,466

(22) Filed: Apr. 30, 2018

(65) Prior Publication Data
US 2019/0310867 A1     Oct. 10, 2019

Related U.S. Application Data

(60) Provisional application No. 62/653,777, filed on Apr. 6, 2018.

(51) Int. Cl.
*G06F 9/451* (2018.01)
*G06F 3/0481* (2022.01)

(52) U.S. Cl.
CPC ............ *G06F 9/451* (2018.02); *G06F 3/0481* (2013.01)

(58) Field of Classification Search
CPC ................................ G06F 9/451; G06F 3/0481
See application file for complete search history.

(56) References Cited

U.S. PATENT DOCUMENTS

| | | | | |
|---|---|---|---|---|
| 6,025,844 A * | 2/2000 | Parsons | ................ | G06F 3/0481 715/805 |
| 6,177,936 B1* | 1/2001 | Cragun | ............... | G06F 16/9577 715/760 |
| 6,195,679 B1* | 2/2001 | Bauersfeld | ............ | G06F 16/954 709/203 |
| 6,489,975 B1* | 12/2002 | Patil | ...................... | G06F 3/0481 715/779 |
| 8,762,879 B1* | 6/2014 | Goodger | ............... | G06F 16/957 715/777 |
| 2004/0003351 A1* | 1/2004 | Sommerer | ............ | G06F 16/955 715/251 |
| 2004/0233235 A1* | 11/2004 | Rubin | ................. | G06F 16/9562 715/738 |
| 2005/0091225 A1* | 4/2005 | McKee | ................. | G06F 16/904 |

(Continued)

OTHER PUBLICATIONS

AT&T Yahoo! "Using Browser Tabs", published 2008, pp. 1-5. (Year: 2008).*

(Continued)

*Primary Examiner* — Stephen S Hong
*Assistant Examiner* — Ahamed I Nazar
(74) *Attorney, Agent, or Firm* — Faegre Drinker Biddle & Reath LLP (57) ABSTRACT

The disclosed implementations can provide a state-based history based on capture, representation, and navigation of a user's exploratory interactions with a user interface of an application. States may be represented in a history board, and one or more states may form a path. As a user explores an application's user interface, the user may branch from a given path and/or return to a prior state. Displaying a visual indication of states and a relationship of those states within a given path to states in other paths, provides a much improved user experience.

20 Claims, 8 Drawing Sheets

(56) References Cited

U.S. PATENT DOCUMENTS

| | | | | |
|---|---|---|---|---|
| 2006/0218500 A1* | 9/2006 | Sauve | ............... | G06F 3/0481 |
| | | | | 715/767 |
| 2010/0011313 A1* | 1/2010 | Sauve | ............... | G06F 3/0481 |
| 2010/0115451 A1* | 5/2010 | Moore | ............... | G06F 16/957 |
| 2011/0066982 A1* | 3/2011 | Paulsami | ............ | G06F 3/0482 |
| | | | | 715/835 |
| 2012/0324423 A1* | 12/2012 | Khan | ..................... | G06F 8/34 |
| | | | | 717/109 |
| 2014/0282118 A1* | 9/2014 | Kumamoto | ........ | G06F 3/0481 |
| | | | | 715/760 |
| 2015/0193549 A1* | 7/2015 | Frye | .................. | G06F 3/0482 |
| | | | | 715/739 |

OTHER PUBLICATIONS

Gratzl, et al., "From Visual Exploration to Storytelling and Back Again", In Proceedings of Eurographics Conference an Visualization, vol. 35, No. 3, Jun. 2016, 10 Pages.

Phillips, James, "Opening Keynote Session", Retrieved from: https:/www.youtube.com/watch?v=zaVGt-IbuhU&t=54m20s, Jun. 12, 2017, 1 Page.

Gratzl, et al., "From Visual Exploration to Storytelling and Back Again", In Eurographics Conference on Visualization (EuroVis), vol. 35, No. 3, Jun. 2016, 10 Pages.

Phillips, James., "Opening Keynote Session: James Phillips, Corporate Vice President, Microsoft", Retrieved from: «https://www.youtube.com/watch?v-zaVGt-IbuhU&t-54m20s», Jun. 12, 2017, 4 Pages.

* cited by examiner

HISTORY AWARE INTERFACES

CROSS-REFERENCE TO RELATED APPLICATIONS

This application claims priority to U.S. provisional patent application No. 62/653,777 filed on Apr. 6, 2018, the entire contents of which is hereby incorporated by reference.

FIELD OF THE DISCLOSURE

The present disclosure relates generally to providing a user interface with an indication of a user's previous interactions with the user interface.

BACKGROUND

In many applications, a user may explore various manipulations of data or engage in a sequence of interactions with the user interface to arrive at a particular result that is displayed in the user interface. When a user interface presents a user with many distinct possibilities for interaction, and the user's task requires exploration of many such possibilities in different sequences and/or combinations, it can be difficult for the user to (1) recall which sequence of actions they used to create a current interface state, (2) compare interface states resulting from different sequences of interactions, (3) know when a user has recreated a prior interface state and what actions followed on previous occasions, (4) easily revisit a previously created interface state, (5) understand the most direct way to create an interface state, (6) communicate interface sates and interaction sequences to others, (7) understand how the user's interactions relate to the interactions of others in the same interface.

Interaction history can be provided as a stack of interface states that grows with each user action. The user can move to the prior stack state by issuing an "undo" command. More than one "undo" command may be issued and a user may utilize a "redo" command to move up the stack including to the top of the stack. However, if at any point in a sequence of "undo" commands the user performs a new interface action, this action replaces the undone actions and becomes the new top of the stack and most recently modified state of the interface. In this sense, a history stack is destructive because a user's interactions can permanently delete prior interface states. History stacks also can have a maximum size in some implementations. The oldest states can be deleted for each new state once this limit is reached.

A history list is a visual representation of an interaction history. It can show a history stack, or a chronological list of states in the order they were visited. If a state is recreated through the interface or revisited by selecting its visual representation in the history list, a new copy of the state is added to the tail of the list. This type of interaction history, however, recreates the same interface many times, and this can generate an excessively large history to store. Furthermore, the interface history of the history list is undifferentiated and lengthy, which can be difficult for users to navigate.

Thus, user interfaces of many applications can be improved to address the deficiencies identified above.

SUMMARY

According to an implementation, a system is provided that includes a non-transitory memory for storing instructions and one or more hardware processors coupled thereto. The one or more hardware processors may be configured to execute the instructions to cause the system to perform the following operations. An indication of a first one or more actions in a user interface of an application may be received. The indication of the first one or more actions may be determined to correspond to a first state in a first path. The first state may include a visual change from an initial appearance of the user interface of the application. The first path may correspond to a first sequence of one or more user interactions with the user interface of the application. An indication of the first state and an indication of the first path may be displayed in the user interface. Subsequent to receiving the indication of the first one or more actions, an indication of a second one or more actions in the user interface of the application may be received. The indication of the second one or more actions may be determined to correspond to a second state in the first path of the first sequence of one or more user interactions with the user interface of the application. An indication of the second state may be displayed in the user interface. The indication of the first path may be updated to indicate that it includes the second state. The user interface may be determined to have returned to the first state. Subsequent to receiving the indication of the second one or more actions, an indication of a third one or more actions in the user interface of the application may be received. The indication of the third one or more actions may be determined to correspond to a third state in a second path. The second path may correspond to a second sequence of one or more user interactions with the user interface of the application and may include the first state and the third state. An indication of the third state and an indication of the second path may be displayed in the user interface.

In some configurations, the operations performed by the system may also include visually distinguishing a portion of the indication of the second path corresponding to the first state and a portion of the second path corresponding to the third state. Furthermore, the user interface of the application may be modified to reflect the first state or second state based upon which state is currently selected.

In some configurations an indication may be received to bookmark the second state. A selection of the bookmark may be received. The user interface may be presented or displayed with visual changes associated with the first state and the second state.

In some configurations, a number of successor states may be determined for at least one of the first state, the second state, and the third state. An indication of the number of successor states may be displayed for at least one of the first state, the second state, and the third state. The indication of the number of successor states may be associated with the first state, the second state, or the third state.

In some configurations, the system may provide navigation controls for the first path. The navigation controls may be selectable by a user, and can rewind or forward the user interface of the application through states associated with the first path.

In an implementation, a computer-implemented method is provided which comprises a series of processes. An indication of a first one or more actions in a user interface of an application may be received. The indication of the first one or more actions may be determined to correspond to a first state in a first path. The first state may include a visual change from an initial appearance of the user interface of the application. The first path may correspond to a first sequence of one or more user interactions with the user interface of the application. An indication of the first state and an indication of the first path may be displayed in the user interface. Subsequent to receiving the indication of the first one or more actions, an indication of a second one or more actions in the user interface of the application may be received. The indication of the second one or more actions may be determined to correspond to a second state in the first path of the first sequence of one or more user interactions with the user interface of the application. An indication of the second state may be displayed in the user interface. The indication of the first path may be updated to indicate that it includes the second state. The user interface may be determined to have returned to the first state. Subsequent to receiving the indication of the second one or more actions, an indication of a third one or more actions in the user interface of the application may be received. The indication of the third one or more actions may be determined to correspond to a third state in a second path. The second path may correspond to a second sequence of one or more user interactions with the user interface of the application and may include the first state and the third state. An indication of the third state and an indication of the second path may be displayed in the user interface.

In some configurations, the disclosed method may also include visually distinguishing a portion of the indication of the second path corresponding to the first state and a portion of the second path corresponding to the third state. Furthermore, the user interface of the application may be modified to reflect the first state or second state based upon which state is currently selected.

In some configurations an indication may be received to bookmark the second state. A selection of the bookmark may be received. The user interface may be presented or displayed with visual changes associated with the first state and the second state.

In some configurations, a number of successor states may be determined for at least one of the first state, the second state, and the third state. An indication of the number of successor states may be displayed for at least one of the first state, the second state, and the third state. The indication of the number of successor states may be associated with the first state, the second state, or the third state.

In some configurations, the disclosed method may provide navigation controls for the first path. The navigation controls may be selectable by a user, and can rewind or forward the user interface of the application through states associated with the first path.

In an implementation, a non-transitory computer readable medium is provided that can store machine readable instructions that, when executed by one or more processors, cause the one or more processors to performs various operations including the following. An indication of a first one or more actions in a user interface of an application may be received. The indication of the first one or more actions may be determined to correspond to a first state in a first path. The first state may include a visual change from an initial appearance of the user interface of the application. The first path may correspond to a first sequence of one or more user interactions with the user interface of the application. An indication of the first state and an indication of the first path may be displayed in the user interface. Subsequent to receiving the indication of the first one or more actions, an indication of a second one or more actions in the user interface of the application may be received. The indication of the second one or more actions may be determined to correspond to a second state in the first path of the first sequence of one or more user interactions with the user interface of the application. An indication of the second state may be displayed in the user interface. The indication of the first path may be updated to indicate that it includes the second state. The user interface may be determined to have returned to the first state. Subsequent to receiving the indication of the second one or more actions, an indication of a third one or more actions in the user interface of the application may be received. The indication of the third one or more actions may be determined to correspond to a third state in a second path. The second path may correspond to a second sequence of one or more user interactions with the user interface of the application and may include the first state and the third state. An indication of the third state and an indication of the second path may be displayed in the user interface.

In some configurations, the disclosed operation may also include visually distinguishing a portion of the indication of the second path corresponding to the first state and a portion of the second path corresponding to the third state. Furthermore, the user interface of the application may be modified to reflect the first state or second state based upon which state is currently selected.

In some configurations an indication may be received to bookmark the second state. A selection of the bookmark may be received. The user interface may be presented or displayed with visual changes associated with the first state and the second state.

In some configurations, a number of successor states may be determined for at least one of the first state, the second state, and the third state. An indication of the number of successor states may be displayed for at least one of the first state, the second state, and the third state. The indication of the number of successor states may be associated with the first state, the second state, or the third state.

In some configurations, the disclosed operations may provide navigation controls for the first path. The navigation controls may be selectable by a user, and can rewind or forward the user interface of the application through states associated with the first path.

Additional features, advantages, and embodiments of the disclosed subject matter may be set forth or apparent from consideration of the following detailed description, drawings, and claims. Moreover, it is to be understood that both the foregoing summary and the following detailed description are exemplary and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

The following discussion is directed to various exemplary implementations. However, one possessing ordinary skill in the art will understand that the implementations disclosed herein have broad application, and that the discussion of any implementation is meant only to be an example of that implementation, and not intended to suggest that the scope of the disclosure, including claims is limited to that implementation.

The disclosed implementations can provide a state-based history based on the capture, representation, and navigation of a user's exploratory interactions with a user interface of an application. For example, a list of user interface states labelled with the action that created them may be displayed. Selection of a labelled state may return the user interface to that state.

The disclosed implementations can provide a compressed, branching history through state merging. In the event that the system detects that a prior interface state has been recreated, it can automatically navigate the interaction history back to that state. This can ensure that each state is represented in a single, identifiable place. Performing an interface action that creates a new successor state can automatically create a new branch while maintaining the last branch, indicating that the user is exploring a new path through the possible states of the interface. Recreating a prior interface state may create a cycle in the history graph, which may refer to a visual representation of user interface states. By automatically navigating back to the prior state in the list of interface states when this occurs, the structure may become a tree. Extracting the list of paths from each leaf of the tree (e.g., an interface state) back to the root state (e.g., the initial user interface state) can create a list-of-lists structure (paths of state sequences) for a simple and compact representation of a potentially complex interaction history further complicated by high redundancy. Individual states of an interaction path can also be expanded to show all existing successors to that state across all paths, and the expanded states can be selected to enable indirect path switching in a single list.

Computing the shortest path to each state from observed state transitions can also be performed. The list-of-lists representation described above may include an indication of the context in which each state was initially created. In some instances, a state may be created through fewer interactions, creating cycles in the underlying history graph. Shortest path algorithms can be applied to this graph of observed state transitions to compute the simplest specification of a state, e.g., a descriptive legend or a simplified representation of provenance. An example shortest path algorithm may include Dijkstra's algorithm, which can produce the shortest-path tree and may be optimized through the use of a Fibonacci heap. A shortest path algorithm may solve the single-source shortest path source problem (e.g., the shortest path to each state from an initial state). As applied in the instant application, the path taken by an individual to create a given state of the application user interface, may be more convoluted than how the given state could be created knowing what the initial and end states are. The produced shortest path may provide the same end state, but with fewer intervening steps. Thus, it can be communicated to other users with greater ease and/or clarity. Other shortest path algorithms may be applied and are well known.

Another feature disclosed herein is intelligent state suggestions from collective and personal interaction history. In some instances, an interface may be used by multiple people. An aggregate interaction history can be computed based on the probability of next-state-creation across all users of the interface. A user can navigate this collective history to understand the distribution of common and uncommon explorations. Similarly, across multiple sessions of interaction with multiple interfaces by the same person, predictive interface "walkthroughs" can be created by combining the user's historic likelihood of performing certain actions (e.g., sorting on a particular column) with the interface's support for those actions.

Also provided is retrospective bookmarking of history states for annotation, sharing, and presentation. By maintaining a complete interaction history, a user can revisit any prior state, discover a new value in that state, and bookmark it for future use. The value in the state may include both a numeric or discrete value as well as a subjective value. For example, a subjective value may be that the particular view in a given state is valuable from an evidence or communication perspective. In contrast, "snapshot"-based bookmarking systems require the user to see the value in an interface state when they create it, since subsequent actions modify the state and prevent the old state from being bookmarked. The list of bookmarks captured from interaction history can reordered, modified, annotated, saved, loaded, and shared with others as an interactive presentation of curated interface states. Bookmarked interface states can also be shared individually, with their interaction provenance acting as a descriptive legend for interpretation and further exploration.

Figure 1:
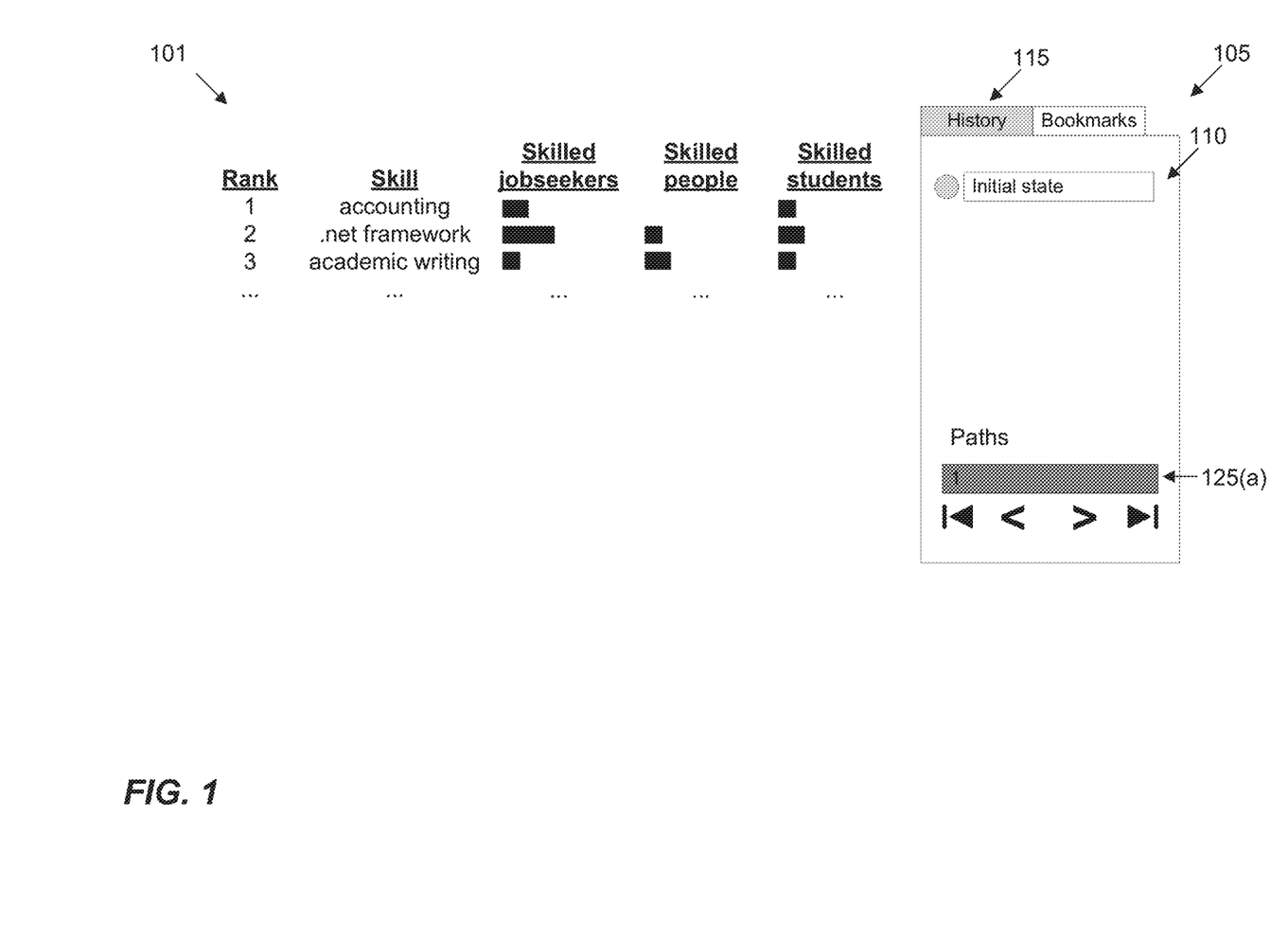
FIG. 1 is an example of a user interface for a database application and includes an example of a visual representation of a history board, according to an implementation disclosed herein.

FIG. 1 illustrates an example of a user interface for a database application and includes an example of a visual representation of a history board. Grayed shapes may indicate a selected tab or feature in FIG. 1. A device executing an application may show a user interface 101. The user interface may include a history board 105. The history board 105 may refer to a visual representation of one or more states of a user interface and/or one or more paths. A history board 105 may provide a visual representation for users to view, navigate, curate, and present their interaction history within a given application. State changes may be reported to the history board 105. The history board 105 visual may have tabs for "History" 115 and "Bookmarks." The history tab 115 may support toggling between chronological and branching views. In the chronological view, successive states may be added to the top of a scrolling state list and labelled with the visual and action that created the state. The application or system may contain machine readable code designed to recognize selection of an attribute (e.g., "select" and <name of attribute>). For example, in FIG. 1, selecting "skilled jobseekers" may cause the state associated with that selection to be labelled as "select skilled jobseekers." Similarly, the visual representation of the state may indicate if the column is sorted in a particular way (e.g., ascending/descending order). The representation of each state may be bookmarked, and a bookmarked state can be seen in the bookmarks tab 120. It will be appreciated that the user interface 101 presented in FIG. 1 is one example of one type of application. The disclosed implementations are not limited to any particular application type and may include, without limitation, photo/video editing, web browsing, word processing, video game, applications. Each application type may have a unique user interface. The history board 105 may be visually represented in many different ways and is not limited to the example representations herein. For example, it may be hidden until requested, represented as a window separate from the window containing the application, integrated into the application interface, etc. One state, the initial state 110, is illustrated in FIG. 1 under the history tab 115. The initial state may be an application user interface as it appears when the application is first initialized.

Figure 2:
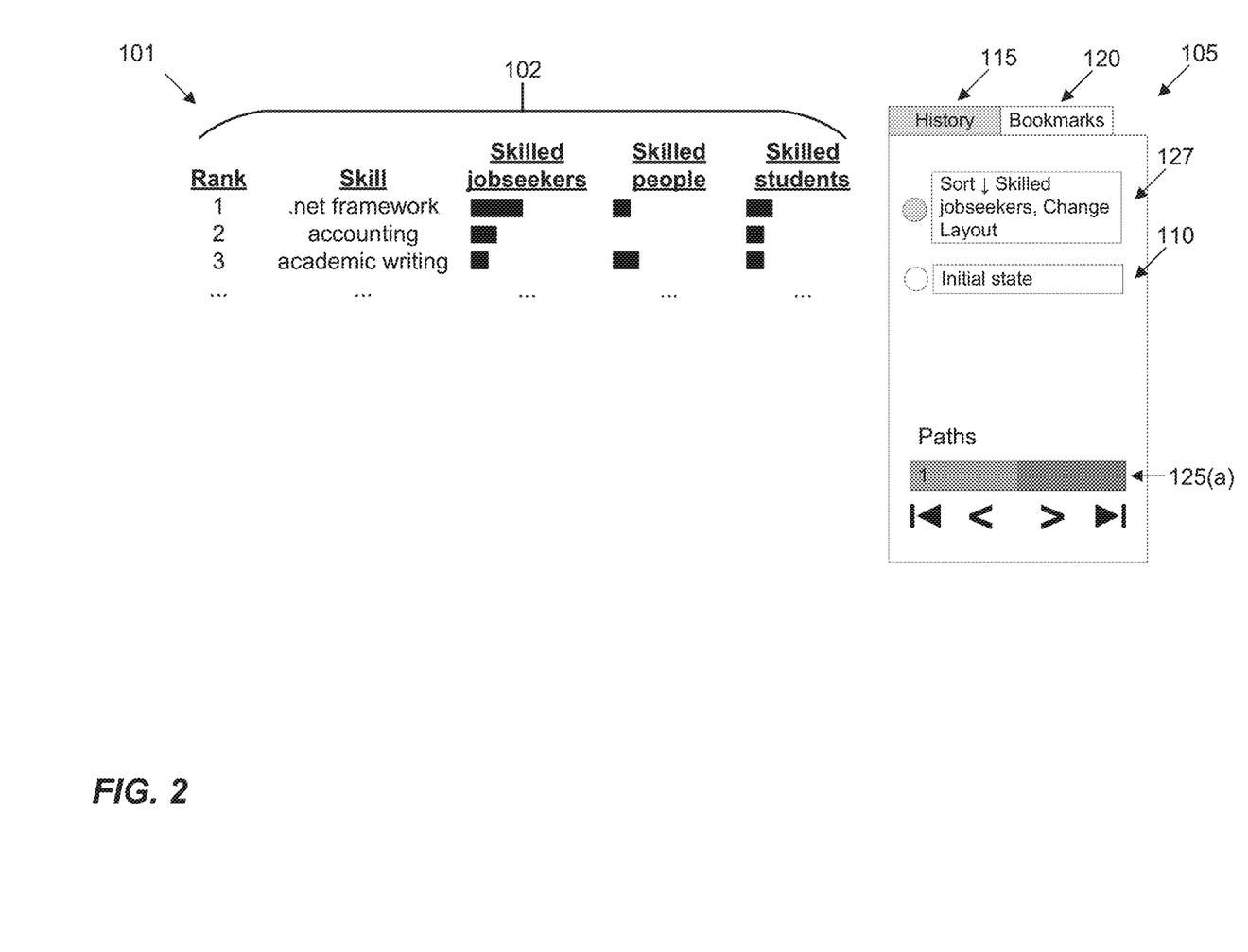
FIG. 2 is an example of a second state being identified and displayed in the history board, according to an implementation disclosed herein.

FIG. 2 illustrates an example of a second state being identified and displayed in the history board. As a state is recognized by the application or system, the state may be appended to or added to a list of states represented in the history board 115. In the example provided in FIG. 2, the application/system has recognized that the "Skilled jobseekers" column was sorted in descending order. This change may be accompanied by a visual change in the appearance of the user interface 101 for the application. Both the indication of the sorting command and the changed layout may appear as labels for the state 127 represented in the history board 105. The process by which a state is recognized may be predefined by the developer of the application and/or system. For example, scrolling a column, changing a layout, or hovering a mouse may not be recognized as a new state in the illustrative example of FIG. 2. Such actions may be helpful to show where such actions occur as a mechanism to orient the user within the history list, even if they are not explicitly recognized as a state. Furthermore, these actions can be combined with a subsequent action and included in the description of the subsequent action (e.g., change layout, sort by skilled students). In contrast, sorting a column may be recognized as a state that is represented in the history board 105. Thus, some interactions may not be predefined as a discrete state (e.g., scrolling, hovering a mouse). The system may nonetheless fully store predefined states and other user input into the application in temporary or long-term storage media of a computing device. Each discrete action may be stored as an object. As an example, in FIG. 2, changing the width of a column may be recorded or stored, but not necessarily represented as a new state in the history board. As another example, scrolling through a list or panning around a map in an application may be stored, but a new state may not be created for these actions. If, however, the user bookmarks the current appearance of the application interface, it may be an indication that the recorded positions in the list or map are important (e.g., what the user is viewing at that moment is important). In such instances, the bookmark may store the state of the position in the list or map so that the state may be returned to.

A state may be predefined for a given application. For example, a developer of visual components for the application may determine what actions are to be considered a state. Similarly, a state may be predefined as a collection of actions. The determination of what constitutes a state may be an abstraction layer for the application or system. In a photo editing application, changing the color of a photo or adding a layer may be predefined as a state. In a web browsing application, a word search or selection of a particular web link may be considered a state. Thus, the definition of what constitutes a state may vary between different application types, and even based upon the developer of the application.

In some configurations, a hash code may be generated for each state. The hash code may be stored in a table and/or stored to a computer readable medium, database, etc. The stored hash code may be stored/communicated to a server via the application, a device upon which the application is operating (e.g., a computer, a mobile device, a smartwatch, a server, etc.), and/or a web-based service. For example, collection of users may perform the same first state when editing a photo such as adjusting the contrast of the image to within a range. Each time a user performs this process, the application may communicate the state to a server or database, which may increment a counter for that state, and/or determine the specific contrast adjustment to determine a range or average of the contrast applied to an image. One or more states and/or bookmarks (e.g., a collection of specific states) may be shared with other users or aggregated to generate a database of states associated with particular actions taken by users of the application. For example, in a photo editing application, the collection of tracked actions among users may indicate that many users adjust the brightness/contrast of an image to a certain range of settings. The photo editing application may, upon opening a photo captured by a user, provide a suggested state for the user that automatically adjusts the brightness/contrast of the user's photo based upon the aggregated data analysis. Thus, given how a user interacts with the application, the disclosed implementations may provide an indication of one or more next actions that other users have been determined to take based upon the actions taken by the user.

FIG. 2 illustrates an example in which some states may refer to a combination of events (e.g., sorting and change layout). Recreation or rediscovery of a prior state may be performed by selecting that state in the state list of the history board 105. For example, selecting the state represented by "Initial state" 110 in FIG. 2 may change the user interface for the application 102 to the representation of the interface illustrated in FIG. 1 (e.g., the initial state). The history board 105 may indicate that the interface is now in the "Initial state" by, for example, highlighting the circle next to the state labelled as the "Initial state."

Figure 3:
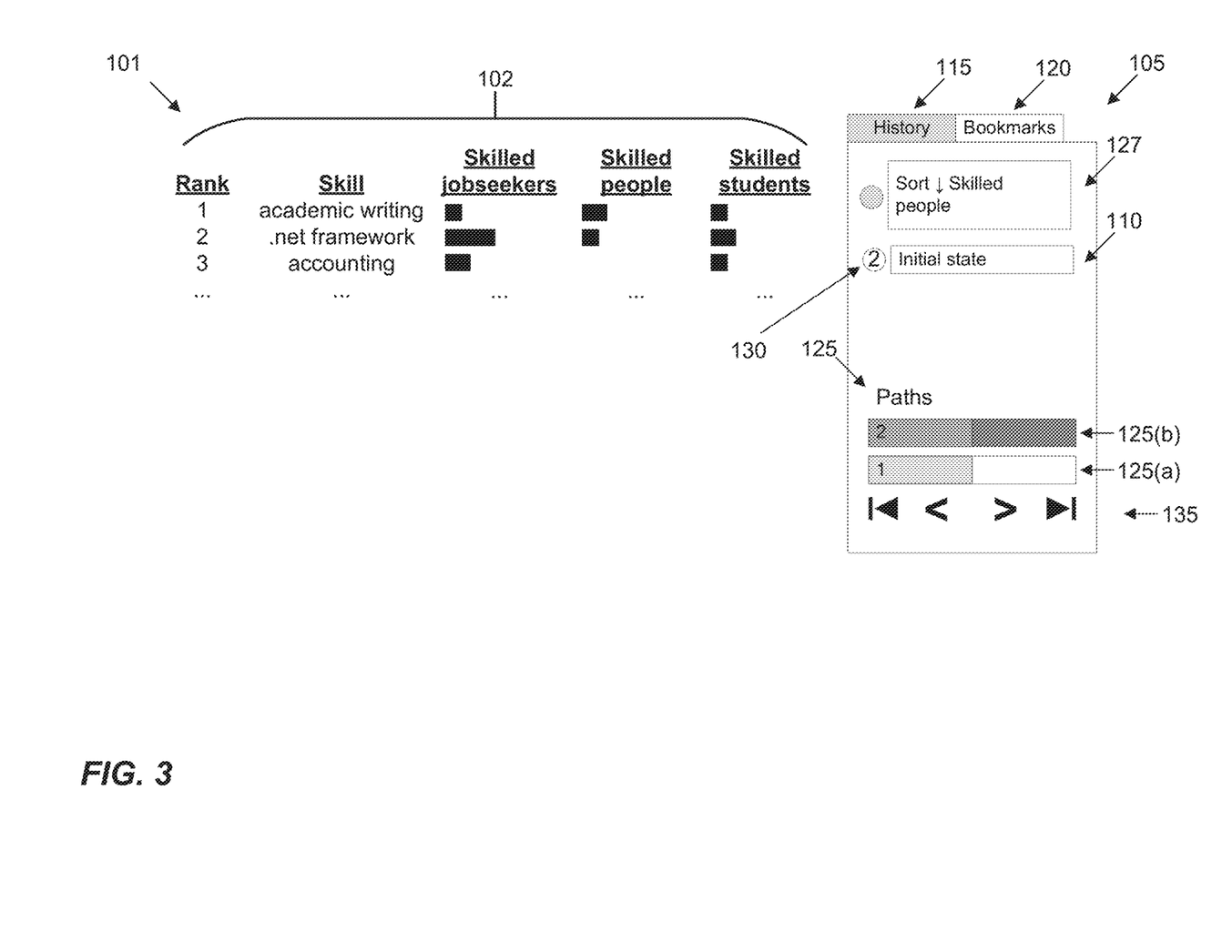
FIG. 3 is an example of a new successor state being created that is original and displayed in the history board, according to an implementation disclosed herein.

FIG. 3 illustrates an example of a new successor state being created that is original and displayed in the history board. Navigating back to a prior state and creating a new successor state that is original may create a new history branch at that point. In the example provided in FIG. 3, a return to the initial state 110 may be followed up with a command to sort by "Skilled people." This new state 127 may be reflected in the appearance of the application user interface 102. To maintain context, this new branch may be displayed as part of a path 125 (125(*a*) and 125(*b*)) containing any state from a prior branch that overlaps with the current path 125. In FIG. 3, for example, two paths are indicated by 125(*a*) and 125(*b*). These paths 125 share in common the same first state (e.g., the initial state) as illustrated by the light gray color. However, the second path 125(*b*) branches from the first path 125(*a*) at the second state 127, and this is reflected in the color scheme of the second path 125(*b*) as explained below. Paths 125 may encode the provenance of state discovery in ways that preserve chronology and minimize the distracting effect of side explorations.

The connections between paths 125 may be indicated, for example, through a circular icon on each state that show the number of successor states across all paths 130 when there is more than one successor. The disclosed implementations are not limited to example representation of the successor states illustrated in FIG. 3. Selecting the successor states icon may expand the state 110 to show an indented, inline list of successor states. For example, in the current example, selection of the initial state 110 may reveal the representation of the user interface when sorting by skilled jobseekers that was performed in the example of FIG. 2, and the sorting by skilled people in the example of FIG. 3. Selecting any successor state may navigate to it and change the appearance of the path 125 to reflect which path the user is currently viewing or that is "active." In some configurations, the history board 105 may show only the states of the currently active path as illustrated in the examples provided in FIGS. 2 and 3. In some configurations, other states may be displayed in the history board 105 even if they are not a part of the current path. For example, the states of the current path may be displayed above a line or the initial state 110 and the other previous states may be displayed below a line or the initial state 110. Other possible visual cues to distinguish current path states from other states may be applied.

Figure 4:
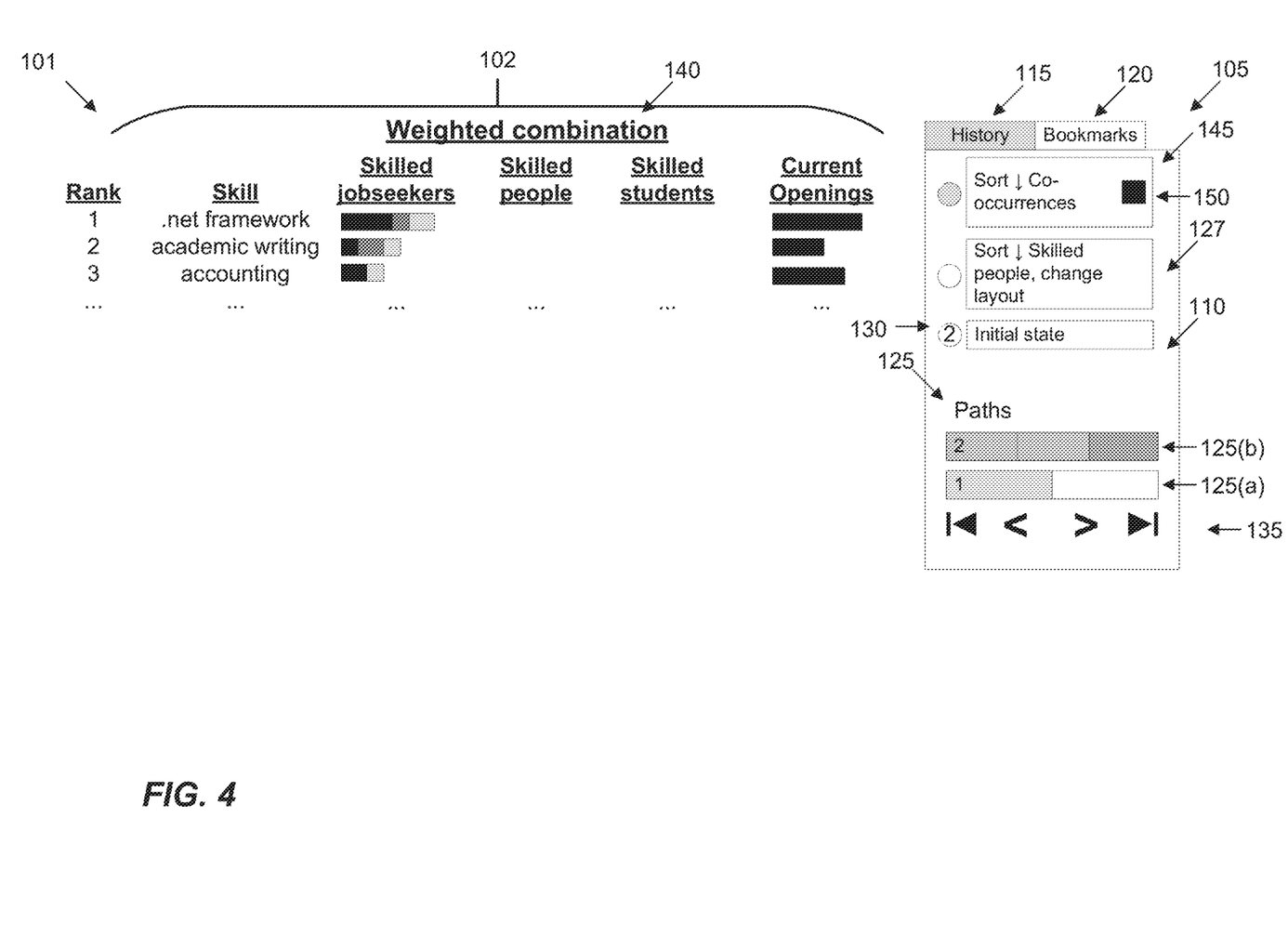
FIG. 4 is an example of the three attributes (e.g., skilled jobseekers, skilled people, and skilled students) being sorted by co-occurrences, according to an implementation.

It will be appreciated that the present disclosure is not limited to any specific visual indication to communicate to the user which path is active. For example, a visual indication may be a color change, highlighting, addition of text, flashing the path, drawing an arrow or other similar visual cue, etc. In FIGS. 1-4, the example visual indication is provided in four gray scale colors. The darkest color can correspond to the current state, a medium color can correspond to states belonging to the same branch (or path) as the current state, a light color can represent states from other branches, and white can represent a state that is not in the current path. The path in FIG. 1 illustrates an example of the dark color. The path in FIG. 2 illustrates an example of the medium color and dark color. The first path in FIG. 3 illustrates the light color and white, while the second path in FIG. 3 illustrates the medium and dark colors. In FIG. 4, the second path has two medium segments and one dark color segment, while the first path has the same color scheme as that of the first path in FIG. 3. Paths 125 can also be selected directly using the "Paths" list at the history tab 115. Paths may be represented as trees, lines, etc. Other color schemes may be utilized to visually represent each path. Visual representations are not limited to color schemes. Any visual representation that indicates the history and branches associated with each path may be utilized. In FIG. 3, each path 125 is numbered and colored based on the original states in its branch, with states added to the right of the paths and above the paths. This visual representation indicates that a left-to-right, bottom-to-top reading may enumerate states in chronological discovery order while also encoding the logical branching structure of the user's interactive exploration.

The examples provided herein are merely for explanation and are not intended to limit the scope of possible representations for the history board, paths, states, and/or application interfaces. In some configurations, the history board 105 is displayed apart from the application interface 102. In some configurations, the history board 105 is displayed above, below, to the left of, or on top of the application interface 102. In some configurations, the layout of the history board 105 may differ from the examples provided herein. For example, the paths 125 may be illustrated at the top of the history board 105 and the states such as 110, 127 may be displayed at the bottom of the history board 105. In some configurations, the paths are displayed as a separate interface element from the representation of the states themselves. Other configurations regarding the color, visual representation, and layout of the history board 105 and elements thereof are contemplated herein.

A path 125 may refer to a collection of one or more user interface states. FIG. 3 provides an example of two paths, path 1 125(*a*) and path 2 125(*b*). Paths may have overlapping states as explained above. For example, a state in one path may also be present in another path. Controls 135 may be provided to navigate through each step associated with a path. For example, if a path includes four states, a user may elect to advance or reverse (e.g., select the ">" or "<") in a stepwise manner, or to advance or reverse to the end/beginning of the path (e.g., select "|◄" or "►|").

The bookmarks tab 120 may provide a visual indication of bookmarked states in a re-orderable list to which new bookmarks may be appended. Each bookmark can be captioned with explanatory text that can be displayed in the history board 110. A bookmark can show its build steps, which may refer to the shortest path in the observed state transition graph from the initial state to the bookmarked state. Build steps can be replayed directly from the bookmark or used to specify the start of a build sequence. Build steps can provide an even shorter and more idealized form of provenance than paths, whose structure aims to balance the need for clear provenance with the need for user orientation during exploratory analysis.

The examples illustrated in FIGS. 1-3 provide an interface for an application in which a user can modify the display of an underlying dataset through persistent and cumulative filters (e.g., date or category filters) and/or apply a transient cross-filter to other visuals that may be overridden by subsequent selections. Such cross-filtering may visually highlight the dataset in the context of pre-filtered values. As stated above, the user interactions and application type illustrated in FIGS. 1-3 is not exhaustive of user interactions for different types of applications. The example interface provided in FIGS. 1-3 may allow the user to view and navigate various attributes provided in the application interface.

FIG. 4 is an example of the three attributes (e.g., skilled jobseekers, skilled people, and skilled students) being sorted by a weighted combination of the number of skilled jobseekers, people, and students 140. The proportional contribution of each selected attribute to this total may be indicated by segmenting the bar of the related attribute into, for example, sections colored by the corresponding attribute pin. The weighted combination may be visually indicated using other methods, such as grayscale bars, numerical representation, a graph, etc. In FIG. 4, the contribution of "Skilled jobseekers" is indicated with a black bar, the contribution of "Skilled people" is indicated with a dark gray bar, and the contribution of "Skilled students" is indicated with a light gray bar. The combined attributes are displayed in a single bar sorted in order beginning with the largest combined bar. The current path and state have been updated in the history board to indicate that a new state has been recognized (e.g., sort by co-occurrences). The second path indicates that that the previous state, sorting by Skilled people, is different from the states in the first path by using color tones to distinguish different states. The current action is also indicated in path 2 as a dark gray bar. The application interface in FIG. 4 may have another column for current openings and from the current display of the interface, it may reveal that there is a high demand for and available supply of individuals with .net framework as a skill. This may be a feature the user desires to bookmark. The bookmark may be activated by selecting, for example, a button in the history board. A bookmark may be received as a command in any number of alternative implementations such as a drop-down menu, a mouse-click, a keyboard command, a gesture, etc.

Figure 5:
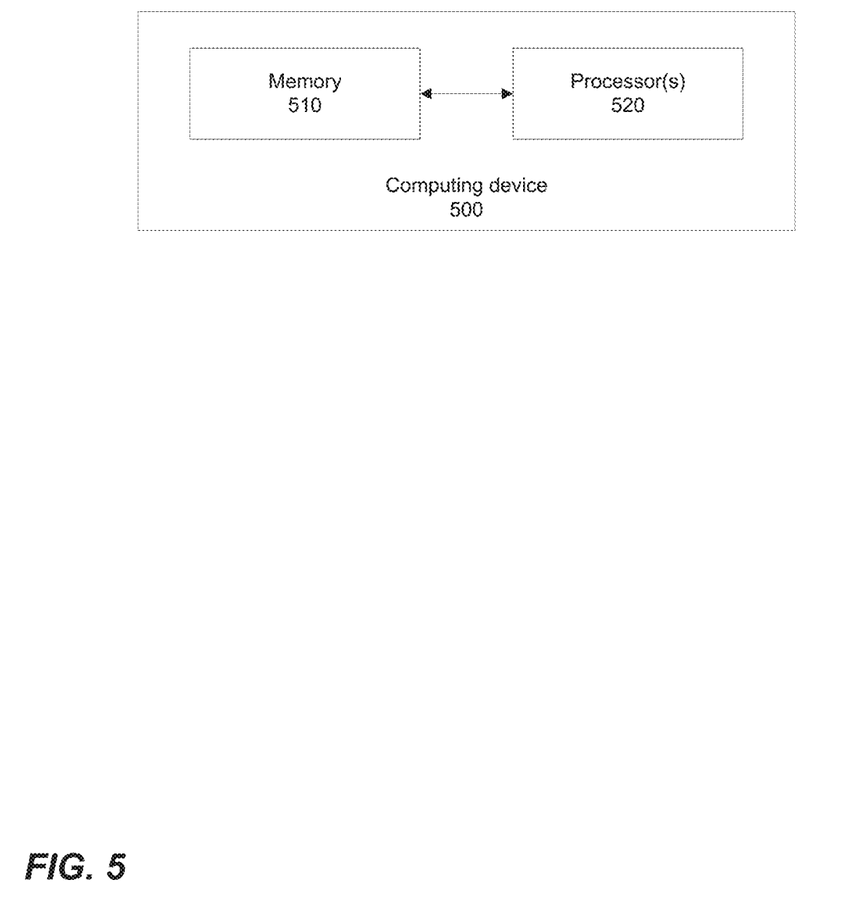
FIG. 5 is an example of a system according to an implementation disclosed herein.

FIG. 5 is an example of a system according to an implementation disclosed herein. The system may include one or more non-transitory memories for storing instructions, and one or more hardware processors that are in communication with one or more of the memories. A memory may refer to short-term (e.g., Flash memory, RAM) or long term storage medium (e.g., a hard drive). The one or more hardware processors may be configured to execute the instructions to cause the system to perform operations. A hardware processor may be a part of a device such as a computer, mobile device, a database, a smartwatch, a server, etc. In FIG. 5, a memory and processor are indicated as discrete elements of a device. However, other configurations may be possible. For example, the application may be a web-based application that is hosted by a remote server. A user may interact with the application via a display on a mobile device. Commands input into the mobile device may be communicated to the server over the Internet, and one or more processors of the server may perform corresponding operations. The server may communicate instructions to the mobile device to modify a display of the application interface on the mobile device.

Figure 6:
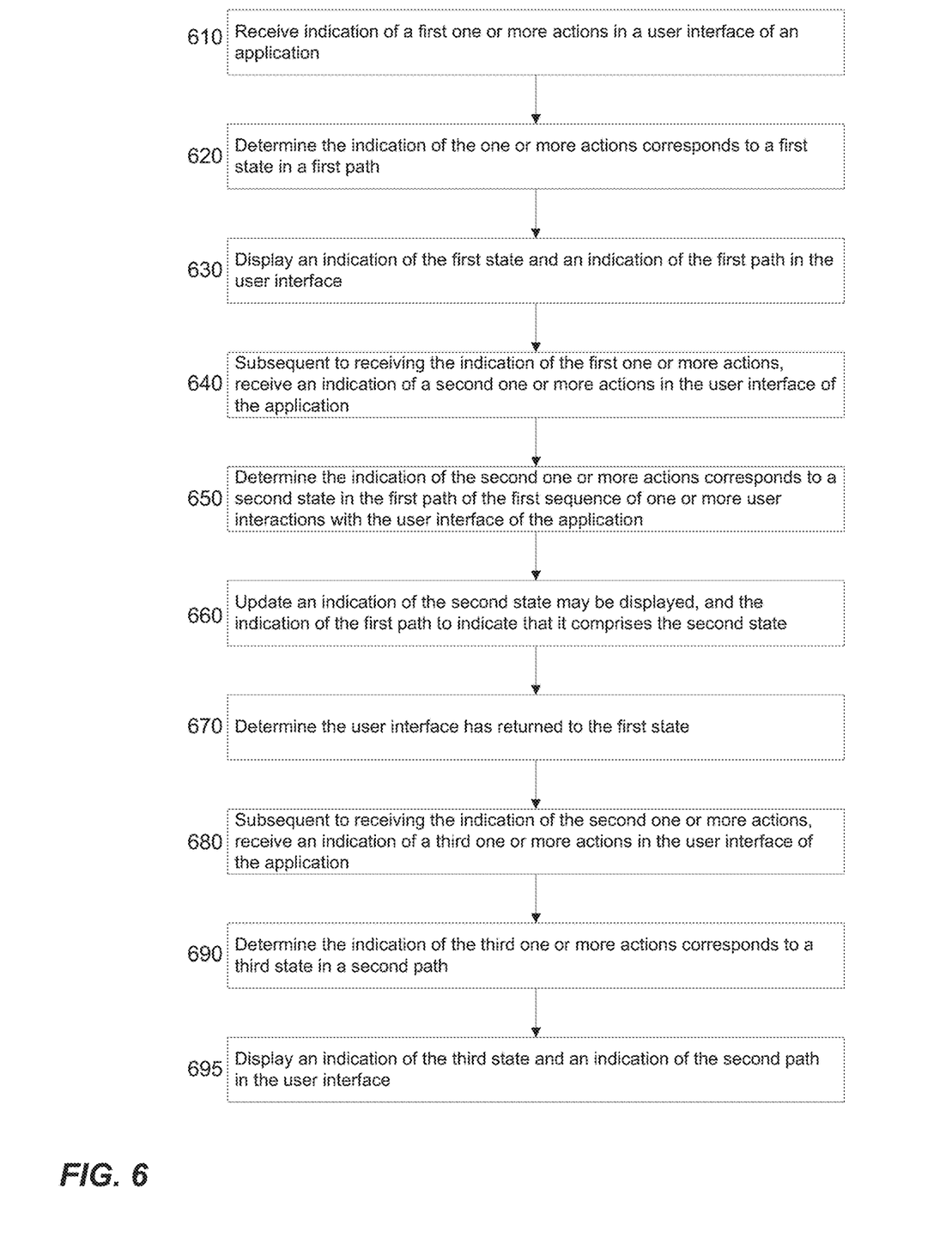
FIG. 6 is an example process or algorithm according to an implementation disclosed herein.

Regardless of the configuration of the memory(ies) and processor(s), a series of instructions may be executed by the system. FIG. 6 provides an example process according to an implementation disclosed herein. The system or any computing device may perform this process. In some implementations, a non-transitory computer readable medium may store machine readable instructions that, when executed by one or more processors, may cause the one or more processors to perform operations such as those provided in FIG. 6.

An indication of a first one or more actions in a user interface of an application may be received at 610. An action may refer to any interaction with a user interface including discrete and non-discrete actions as explained earlier. Different types of applications may have different application interfaces, but there may be overlap between some functions. For example, a web browsing application may have forward/backward commands, search terms, bookmarking, universal resource locator entry, sharing a web page, html reading/editing, plug-in functions that augment a web-browser's functionality (e.g., ad-blocking, image preview, etc.), reload function, a user profile, etc. In contrast, a photo editing application may have features directed to cropping a photo, adjusting color-/gray-scale of a photo, sharing a photo, adding text or shapes, organizing layers, etc. The disclosed implementations are not limited to any particular application type. Actions may be recorded in a table in the form of a hash code or as a labeled term. The table may be stored remotely (e.g., on board the computing device) or remotely. The table may be updated with each action or periodically. A developer of an application, for example, may define actions that are to be recorded and/or exclude actions from being recorded. An indication of an action may refer to receipt of input from an input device such as a touchscreen, a camera, a keyboard, a mouse, or the like by the computing device.

The indication of the one or more actions may be determined to correspond to a first state in a first path at 620. A state, therefore, may refer to a combination one or more actions. For example, in FIG. 4, sorting by co-occurrences is a single action and corresponds to a single state. Soring by skilled people and the associated change layout, however, includes two actions that are recognized as a single state. Thus, each application may have a predefined list of what constitutes an action, and what one or more actions are sufficient to constitute a state. Adjusting the width of a column in FIG. 4 may not constitute a state even though it may be a recorded user interaction with the application interface. The first state may include a visual change from an initial appearance of the user interface of the application. A path, such as the first path, may correspond to a first sequence of one or more user interactions with the user interface of the application, as explained above. For example, a sequence of user interactions may be identified as a state, and the path may visually display each state in a current path (e.g., the first path in this example).

At 630, an indication of the first state and an indication of the first path may be displayed in the user interface. An indication of the first state and first path may refer to a visual display of such on the computing device. An example of such indications is provided in FIGS. 1-3 with regard to the history board and without limitation. The display of the indication of the first state and the indication of the first path may be maintained in the user interface of the application independent of subsequent user interactions with the user interface. For example, an application interface may overlay the history board on top of the existing application interface. In some configurations, the history board may be maintained as a feature of the application and incorporated into the user interface (e.g., in the same container such as a window as the application). In some configurations, the history board may be hidden or minimized.

Subsequent to receiving the indication of the first one or more actions at 610, an indication of a second one or more actions in the user interface of the application may be received at 640. At this stage, the user may perform additional interactions with an application's user interface. These actions may be recorded as described above. The indication of the second one or more actions may be determined to correspond to a second state in the first path of the first sequence of one or more user interactions with the user interface of the application at 650. As above, what constitutes a state may be predefined for each application or the system upon which the application is being operated. A path may reflect one or more states for the current exploration of the application. Each state in the path may be revisited. Here, the second state may be associated with the first path. Thus, both the first state and the second path may be a part of the same exploratory path. An indication of the second state may be displayed, and the indication of the first path may be updated to indicate that it comprises the second state at 660. For example, the indication of the second state may be visually displayed on the screen such as the states illustrated in the history board of the examples provided in FIGS. 1-4. Display of the indication of the second state may be maintained in the user interface of the application independent of subsequent user interactions with the user interface as above.

As described earlier, any state may be bookmarked, and any current appearance of the user interface for the application may be bookmarked to create a state. For example, adjustment of column widths may not be ordinarily identified as a state. If the user bookmarks the state after adjusting column widths, however, the state of the user interface may be stored and recalled at a later date by retrieving the bookmark. In some instances, an action such as adjusting column widths may be appended to the current state, rather than generate a new state. For example, if a user has sorted by column A, adjusts column widths, and then saves the state as a bookmark, the bookmark may record as a state sorting by column A and adjusting column widths as one state. As described earlier, each state may be retained in a hash table, or the like. The table may be shared with other users, a developer, a platform.

At 670, the user interface may be determined to have returned to the first state. For example, the user may have selected the indication of the first state in the first path, or the user may have performed one or more actions that caused the system to return to the first state. Rather than add a new indication of the reversion to the first state (e.g., as a third state), which may complicate the history board, the system may indicate that the first state is now active as shown in the examples provided in FIGS. 1-4.

Subsequent to receiving the indication of the second one or more actions, an indication of a third one or more actions in the user interface of the application may be received at 680. The indication of the second one or more actions, as with other indications herein, may refer to receiving input into the application, and this input may result in a visual change to the user interface of the application. The indication of the third one or more actions may be determined to correspond to a third state in a second path at 690. The second path may correspond to a second sequence of one or more user interactions with the user interface of the application and may include the first state and the third state. An indication of the third state and an indication of the second path may be displayed in the user interface at 695. As illustrated in the examples provided in FIGS. 1-4, the history board may display multiple paths, and each state represented in each path may be differentiated and selectable to return the user interface to a given state. Each state in the path may also indicate whether it is a new state or how it relates to states in other paths, for example, by varying the color of the state in the path. Thus, a portion of the indication of the second path corresponding to the first state and a portion of the second path corresponding to the third state may be visually distinguished. The user interface of the application may be modified to reflect the first state or second state based upon which state is currently selected. The display of the indication of the first state and the indication of the first path may be maintained in the user interface of the application independent of subsequent user interactions with the user interface.

As an example, a first action may be sorting column A, and this may be determined to be a first state. A second action may be filtering results to display only those related to holographic computing, and this may be determined to be a second state. Both the first state and the second state may be a part of the first path. The first path, therefore, may show the combined display of sorting by column A, and then filtering for holographic computing. At 670, in this example, the user may have moved undone the filtering for holographic computing, or have simply clicked the first state to return the user interface to the state. At 680, to continue in this example, the user may have performed a new interaction with the user interface (e.g., a third action), such as add a new column D, which is recognized as a third state at 690. In this case, since the third state builds upon the first state (e.g., sorting column A), but branches from the second state (e.g., filtering), it may be represented as a second path at 700. Thus, the second path may include a visual representation of the first state and the third state.

As shown in the example provided in FIG. 3, when multiple successor states for a given state are created, an indication of the number of successor states may be displayed. In FIG. 3, an example of such an indication is provided at 130. Thus, the system may determine a number of successor states for each state present, and display an indication thereof when the determined number exceeds one. In some configurations the paths 125 may be represented as a list, and a user may switch between paths by selecting a different path and/or by selecting a successor state from an expanded state list. For example, if the application user interface is currently in path 1, and a user selects a successor state corresponding to path 2, the application may switch from path 1 to path 2. A visual cue may be displayed to indicate which path or state is currently selected or active. A visual cue may include, highlighting, underlining, a text label, etc. For example, the currently active path may be underlined.

Figure 7:
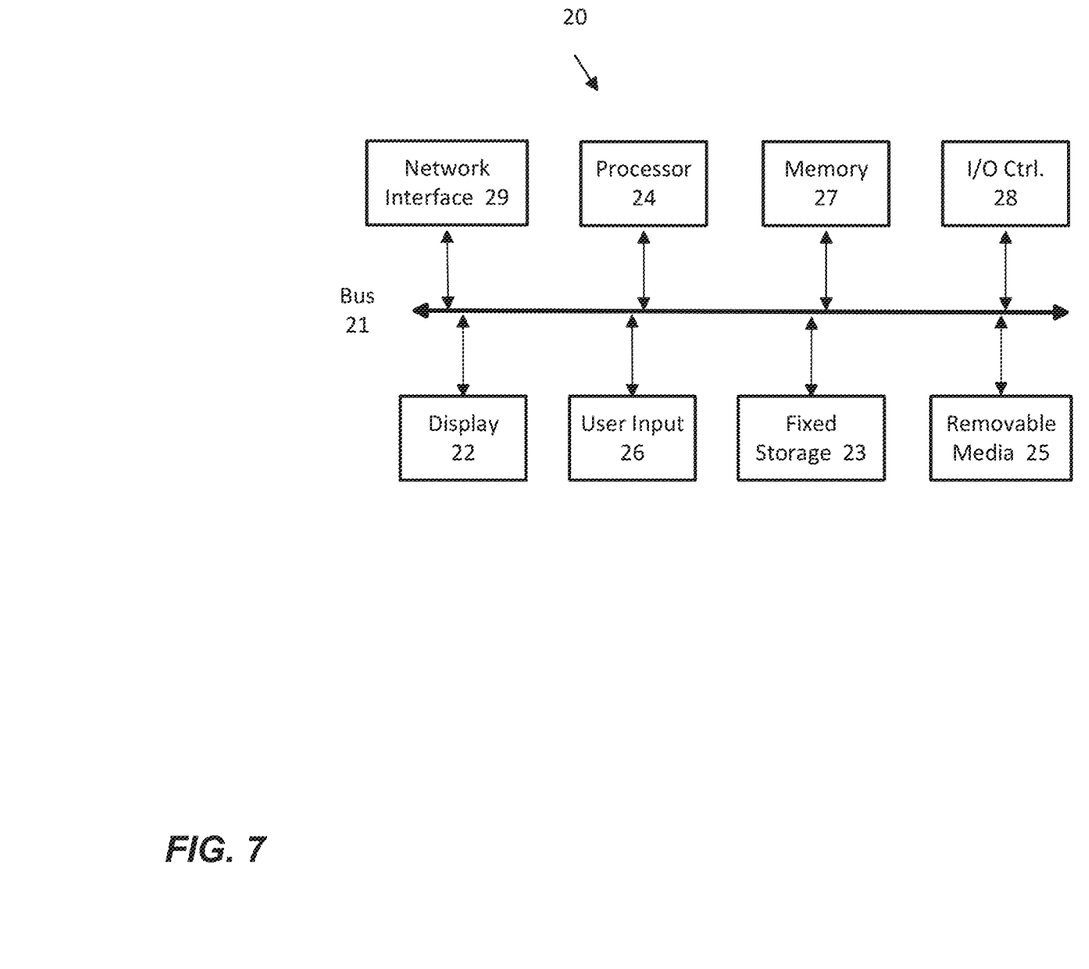
FIG. 7 is an example computing device suitable for implementing embodiments of the presently disclosed subject matter.

Embodiments of the presently disclosed subject matter may be implemented in and used with a variety of component and network architectures. FIG. 7 is an example computer or computing device 20 (e.g., electronic device such as a smartphone, smartwatch, tablet, laptop, personal computer, etc.) suitable for implementing embodiments of the presently disclosed subject matter. The computer 20 includes a bus 21 which interconnects major components of the computer 20, such as a central processor 24, a memory 27 (typically RAM, but which may also include read-only memory ("ROM"), flash RAM, or the like), an input/output controller 28, a user display 22, such as a display screen via a display adapter, a user input interface 26, which may include one or more controllers and associated user input devices such as a keyboard, mouse, camera, and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include ROM or flash memory (neither shown), and RAM (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may allow the computer to communicate with other computers via one or more local, wide-area, or other networks. Many other devices or components (not shown) may be connected in a similar manner (e.g., digital cameras or speakers). Conversely, all of the components shown in FIG. 7 need not be present to practice the present disclosure. The components can be interconnected in different ways from that shown. The operation of a computer such as that shown in FIG. 7 is readily known in the art and is not discussed in detail in this application. Code to implement the present disclosure can be stored in computer-readable storage media such as one or more of the memory 27, fixed storage 23, removable media 25, or on a remote storage location.

Figure 8:
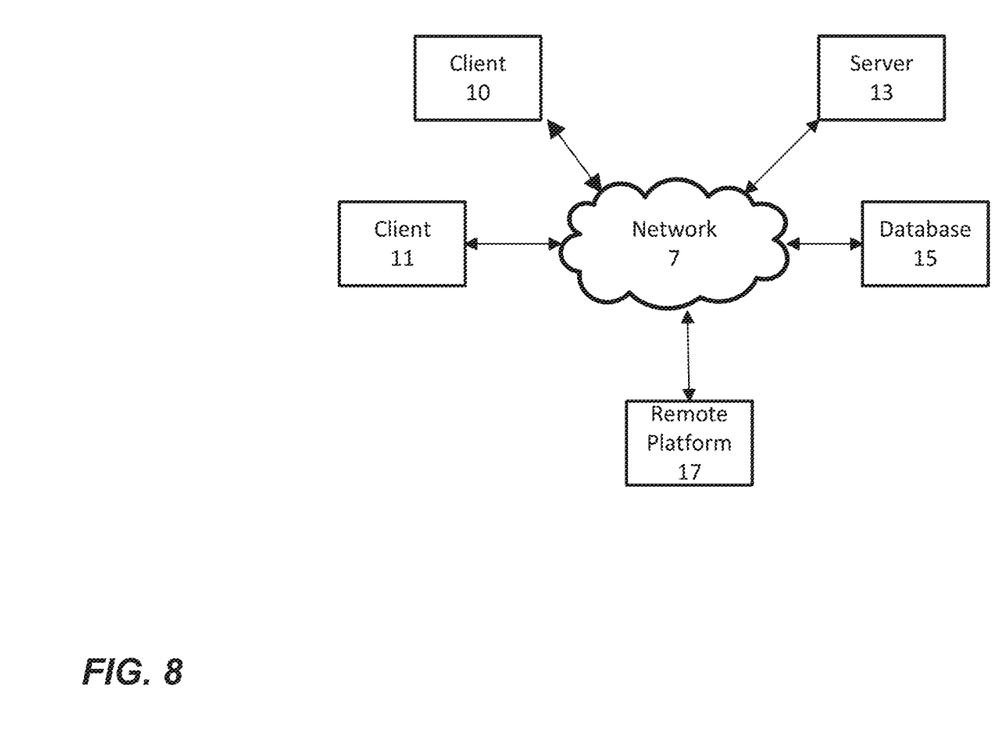
FIG. 8 shows an example network arrangement according to an embodiment of the disclosed subject matter.

FIG. 8 shows an example network arrangement according to an embodiment of the disclosed subject matter. One or more clients 10, 11, such as computing devices including, but not limited to, local computers, smartphones, tablet computing devices, and the like may connect to other devices via one or more networks 7. As described earlier, the communication partner may operate a client device that is remote from the device operated by the user (e.g., in separate locations). The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15.

More generally, various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing embodiments of the disclosed subject matter. Embodiments also may be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing embodiments of the disclosed subject matter.

When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

What is claimed is:

1. A system, comprising:
a non-transitory memory for storing instructions;
one or more hardware processors that are coupled to the non-transitory memory and that are configured to execute the instructions to cause the system to perform operations comprising:
receiving an indication of a first one or more actions in a user interface of an application;
determining that the indication of the first one or more actions corresponds to a first state in a first path, the first state comprising a visual change from an initial appearance of the user interface of the application, the first path corresponding to a first sequence of one or more user interactions with the user interface of the application;
displaying in the user interface an indication of the first state, an indication of the first path, the received indication of the first one or more actions in the user interface of the application, an indication of states from other paths, the indication of states from other paths not connected to the first path, an indication of connections between paths on each state that shows a number of successor states across all paths, and an indication whether other states are not in the first path;
subsequent to receiving the indication of the first one or more actions, receiving an indication of a second one or more actions in the user interface of the application;
determining that the indication of the second one or more actions corresponds to a second state in the first path of the first sequence of one or more user interactions with the user interface of the application;
displaying in the user interface an indication of the second state, updating the indication of the first path to indicate that the first path comprises the second state, the received indication of the second one or more actions in the user interface of the application, the indication of states from other paths, the indication of states from other paths not connected to the first path, the indication of connections between paths on each state that shows the number of successor states across all paths, and the indication whether other states are not in the first path;
determining that the user interface has returned to the first state;
subsequent to receiving the indication of the second one or more actions, receiving an indication of a third one or more actions in the user interface of the application;
determining that the indication of the third one or more actions corresponds to a third state in a second path, the second path corresponding to a second sequence of one or more user interactions with the user interface of the application and comprising the first state and the third state; and displaying in the user interface an indication of the third state, an indication of the second path, the received indication of the third one or more actions in the user interface of the application, the indication of states from other paths, the indication of states from other paths not connected to the first path and the second path, the indication of connections between paths on each state that shows the number of successor states across all paths, an indication whether other states are not in the first path and second path, and the second path indicates that that the first state is different from the states in the first path by using tones to distinguish different states.

2. The system of claim 1, wherein the operations further comprise:

visually distinguishing a portion of the indication of the second path corresponding to the first state and a portion of the second path corresponding to the third state; and modifying the user interface of the application to reflect the first state or second state based upon which state is currently selected.

3. The system of claim 1, wherein the operations further comprise:

receiving an indication by the user to bookmark the second state.

4. The system of claim 3, wherein the operations further comprise:

receiving a selection of the bookmark; and presenting the user interface with visual changes associated with the first state and the second state.

5. The system of claim 1, wherein the operations further comprise:

determining a number of successor states for at least one of the first state, the second state, and the third state; and displaying an indication of the number of successor states for at least one of the first state, the second state, and the third state.

6. The system of claim 5, wherein the indication of the number of successor states is associated with the first state, the second state, or the third state.

7. The system of claim 1, wherein the operations further comprise:

providing navigation controls for the first path, wherein the navigation controls are selectable by a user, and rewind or forward the user interface of the application through states associated with the first path.

8. A computer-implemented method, comprising:

receiving an indication of a first one or more actions in a user interface of an application;

determining that the indication of the first one or more actions corresponds to a first state in a first path, the first state comprising a visual change from an initial appearance of the user interface of the application, the first path corresponding to a first sequence of one or more user interactions with the user interface of the application;

displaying in the user interface an indication of the first state, an indication of the first path, the received indication of the first one or more actions in the user interface of the application, an indication of states from other paths, the indication of states from other paths not connected to the first path, an indication of connections between paths on each state that shows a number of successor states across all paths, and an indication whether other states are not in the first path, wherein the display of the indication of the first state and the indication of the first path is maintained in the user interface of the application independent of subsequent user interactions with the user interface;

subsequent to receiving the indication of the first one or more actions, receiving an indication of a second one or more actions in the user interface of the application;

determining that the indication of the second one or more actions corresponds to a second state in the first path of the first sequence of one or more user interactions with the user interface of the application;

displaying in the user interface an indication of the second state, updating the indication of the first path to indicate that the first path comprises the second state, the received indication of the second one or more actions in the user interface of the application, the indication of states from other paths, the indication of states from other paths not connected to the first path, the indication of connections between paths on each state that shows the number of successor states across all paths, and the indication whether other states are not in the first path, wherein the display of the indication of the second state is maintained in the user interface of the application independent of subsequent user interactions with the user interface;

determining that the user interface has returned to the first state;

subsequent to receiving the indication of the second one or more actions, receiving an indication of a third one or more actions in the user interface of the application;

determining that the indication of the third one or more actions corresponds to a third state in a second path, the second path corresponding to a second sequence of one or more user interactions with the user interface of the application and comprising the first state and the third state; and displaying in the user interface an indication of the third state, an indication of the second path, the received indication of the third one or more actions in the user interface of the application, the indication of states from other paths, the indication of states from other paths not connected to the first path and the second path, the indication of connections between paths on each state that shows the number of successor states across all paths, an indication whether other states are not in the first path and second path, and the second path indicates that that the first state is different from the states in the first path by using tones to distinguish different state, wherein the display of the indication of the first state and the indication of the first path is maintained in the user interface of the application independent of subsequent user interactions with the user interface.

9. The computer-implemented method of claim 8, further comprising:

visually distinguishing a portion of the indication of the second path corresponding to the first state and a portion of the second path corresponding to the third state; and modifying the user interface of the application to reflect the first state or second state based upon which state is currently selected.

10. The computer-implemented method of claim 8, further comprising:

receiving an indication by the user to bookmark the second state.

11. The computer-implemented method of claim 10, further comprising:
receiving a selection of the bookmark; and
displaying the user interface with visual changes associated with the first state and the second state.

12. The computer-implemented method of claim 8, further comprising:
determining a number of successor states for at least one of the first state, the second state, and the third state; and
presenting an indication of the number of successor states for at least one of the first state, the second state, and the third state.

13. The computer-implemented method of claim 12, wherein the indication of the number of successor states is associated with the first state, the second state, or the third state.

14. The computer-implemented method of claim 8, further comprising:
providing navigation controls for the first path, wherein the navigation controls are selectable by a user, and rewind or forward the user interface of the application through states associated with the first path.

15. A non-transitory computer readable medium, storing machine readable instructions that, when executed by one or more processors, cause the one or more processors to:
receiving an indication of a first one or more actions in a user interface of an application;
determining that the indication of the first one or more actions corresponds to a first state in a first path, the first state comprising a visual change from an initial appearance of the user interface of the application, the first path corresponding to a first sequence of one or more user interactions with the user interface of the application;
displaying in the user interface an indication of the first state, an indication of the first path, the received indication of the first one or more actions in the user interface of the application, an indication of states from other paths, the indication of states from other paths not connected to the first path, an indication of connections between paths on each state that shows a number of successor states across all paths, and an indication whether other states are not in the first path, wherein the display of the indication of the first state and the indication of the first path is maintained in the user interface of the application independent of subsequent user interactions with the user interface;
subsequent to receiving the indication of the first one or more actions, receiving an indication of a second one or more actions in the user interface of the application;
determining that the indication of the second one or more actions corresponds to a second state in the first path of the first sequence of one or more user interactions with the user interface of the application;
displaying in the user interface an indication of the second state, updating the indication of the first path to indicate that the first path comprises the second state, the received indication of the second one or more actions in the user interface of the application, the indication of states from other paths, the indication of states from other paths not connected to the first path, the indication of connections between paths on each state that shows the number of successor states across all paths, and the indication whether other states are not in the first path, wherein the display of the indication of the second state is maintained in the user interface of the application independent of subsequent user interactions with the user interface;
determining that the user interface has returned to the first state;
subsequent to receiving the indication of the second one or more actions, receiving an indication of a third one or more actions in the user interface of the application;
determining that the indication of the third one or more actions corresponds to a third state in a second path, the second path corresponding to a second sequence of one or more user interactions with the user interface of the application and comprising the first state and the third state; and
displaying in the user interface an indication of the third state, an indication of the second path, the received indication of the third one or more actions in the user interface of the application, the indication of states from other paths, the indication of states from other paths not connected to the first path and the second path, the indication of connections between paths on each state that shows the number of successor states across all paths, an indication whether other states are not in the first path and second path, and the second path indicates that that the first state is different from the states in the first path by using tones to distinguish different state,
wherein the display of the indication of the first state and the indication of the first path is maintained in the user interface of the application independent of subsequent user interactions with the user interface.

16. The non-transitory computer readable medium of claim 15, wherein the operations further comprise:
visually distinguishing a portion of the indication of the second path corresponding to the first state and a portion of the second path corresponding to the third state; and
modifying the user interface of the application to reflect the first state or second state based upon which state is currently selected.

17. The non-transitory computer readable medium of claim 15, wherein the operations further comprise:
receiving an indication by the user to bookmark the second state.

18. The non-transitory computer readable medium of claim 17, wherein the operations further comprise:
receiving a selection of the bookmark; and
presenting the user interface with visual changes associated with the first state and the second state.

19. The non-transitory computer readable medium of claim 15, wherein the operations further comprise:
determining a number of successor states for at least one of the first state, the second state, and the third state; and
displaying an indication of the number of successor states for at least one of the first state, the second state, and the third state.

20. The non-transitory computer readable medium of claim 15, wherein the operations further comprise:
providing navigation controls for the first path, wherein the navigation controls are selectable by a user, and rewind or forward the user interface of the application through states associated with the first path.

* * * * *